United States Patent [19]
Kapoor et al.

[11] Patent Number: 6,083,299
[45] Date of Patent: Jul. 4, 2000

[54] HIGH PRESSURE PURGE PRESSURE SWING ADSORPTION PROCESS

[75] Inventors: Akhilesh Kapoor, Basking Ridge; YuDong Chen, Bridgewater, both of N.J.; Ravi Kumar, Allentown, Pa.; Robert M. Thorogood, Murray Hill, N.J.; Simon Davies, Guildford, United Kingdom

[73] Assignee: The BOC Group, Inc., Murray Hill, N.J.

[21] Appl. No.: 09/235,027

[22] Filed: Jan. 21, 1999

[51] Int. Cl.$^7$ .................................................. B01D 53/047
[52] U.S. Cl. .................................. 95/100; 95/103; 95/105; 95/140
[58] Field of Search ..................... 95/96–98, 100–105, 95/130, 140

[56] References Cited

U.S. PATENT DOCUMENTS

| | | | |
|---|---|---|---|
| Re. 32,590 | 2/1988 | Sakuraya et al. .................... | 95/140 X |
| 4,171,206 | 10/1979 | Sicar ..................................... | 55/26 |
| 4,726,816 | 2/1988 | Fuderer ................................. | 95/98 |
| 4,732,577 | 3/1988 | Koizumi et al. ....................... | 95/101 |
| 4,834,780 | 5/1989 | Benkmann ............................. | 95/140 X |
| 5,096,470 | 3/1992 | Krishnamurthy ..................... | 95/102 |
| 5,112,590 | 5/1992 | Krishnamurthy et al. ............ | 95/140 X |
| 5,133,785 | 7/1992 | Kumar et al. .......................... | 55/26 |
| 5,203,888 | 4/1993 | Maurer .................................. | 95/140 X |
| 5,234,472 | 8/1993 | Krishnamurthy et al. ............ | 95/140 X |
| 5,354,346 | 10/1994 | Kumar .................................. | 95/140 X |
| 5,529,763 | 6/1996 | Peng et al. ............................ | 95/140 X |
| 5,531,809 | 7/1996 | Golden et al. ........................ | 95/140 X |
| 5,882,380 | 3/1999 | Sircar ................................... | 95/98 |
| 5,980,857 | 11/1999 | Kapoor et al. ........................ | 95/140 X |
| 5,993,517 | 11/1999 | Chen et al. ........................... | 95/140 X |

*Primary Examiner*—Robert H. Spitzer
*Attorney, Agent, or Firm*—Philip H. Von Neida; Salvatore P. Pace

[57] ABSTRACT

A high pressure purge is incorporated into the cycle of a PSA process designed for the recovery of strongly adsorbed product gas from a gas mixture. The high pressure purge stream is obtained by compressing the low pressure cocurrent purge step that precedes the countercurrent depressurization or evacuation step. The high pressure purge step is included in the cycle following the adsorption step of the process.

28 Claims, 9 Drawing Sheets

HIGH PRESSURE PURGE PRESSURE SWING ADSORPTION PROCESS

FIELD OF THE INVENTION

This invention relates to a pressure swing adsorption (PSA) process, and more particularly to a PSA process for recovering strongly adsorbed components of a gas stream. In particular, the invention relates to PSA adsorption cycles having one or more additional purge steps which improve the purity of strongly adsorbed product streams.

BACKGROUND OF THE INVENTION

Components of gas mixtures are frequently separated from the gas mixtures by PSA. Although PSA is generally more useful when the desired component is the least strongly adsorbed component, this gas separation technique can be successfully used when the desired component is more strongly adsorbed by the selected adsorbent than are the other components of the gas mixture. For example, carbon monoxide can be separated from gas mixtures containing, in addition to carbon monoxide, hydrogen, carbon dioxide, methane and nitrogen by means of cuprous ion-containing adsorbents. Such mixtures often occur in syngas, a hydrogen and carbon monoxide mixture produced in hydrocarbon reforming processes.

PSA processes are commonly carried out in elongate vessels having an inlet end and a nonadsorbed product outlet end and which are packed with a bed of particulate material which adsorbs one or more components of the gas mixture more strongly than it adsorbs one or more other components of the gas mixture. PSA processes include the basic steps of adsorption and adsorbent regeneration. During the adsorption step, the gas mixture to be separated is passed cocurrently through an adsorption vessel (in the direction from the inlet end towards the nonadsorbed product outlet end) at a selected adsorption pressure. The strongly adsorbed component(s) are adsorbed from the gas mixture as it passes through the vessel, and the nonadsorbed component(s) pass out of the vessel through the nonadsorbed product outlet. During the adsorbent regeneration step, the vessel is depressurized by releasing or withdrawing (evacuating) gas countercurrently (in the direction opposite the cocurrent direction) out of the vessel. The strongly adsorbed component(s) are removed from the vessel during the adsorbent regeneration step.

In addition to the basic steps, PSA processes generally have a number of additional steps. One important step is bed equalization, in which gas discharged from an adsorption vessel upon completion of the adsorption step (equalization-depressurization) is reintroduced in the vessel (or introduced into another vessel, in the case of multivessel systems) after completion of the adsorbent regeneration step (equalization-repressurization). During equalization, the gas can be removed from a vessel via its outlet end and reintroduced into the vessel via its outlet end (outlet-to-outlet equalization) or it can be removed from the vessel via its inlet end and reintroduced into the vessel via its inlet end (inlet-to-inlet equalization) or by other combinations of these. Conventional bed equalization serves two important purposes: it saves energy by using compressed gas released from an adsorption vessel after an adsorption step to partially repressurize the vessel for the adsorption step of the following cycle of the process, and it allows recovery of valuable partially fractionated gas component.

Another step that enhances the efficiency of adsorption processes is the purge or rinse step. This step generally assists in the regeneration of the adsorbent or enrichment of the product, and it can take place before, during or after the countercurrent depressurization step. When the primary purpose of the PSA process is to recover nonadsorbed product, the purge is carried out by passing low pressure nonadsorbed product gas countercurrently through the adsorption vessel during or after the countercurrent depressurization step. When the primary product is the strongly adsorbed component of the mixture, the purge step is carried out by passing strongly adsorbed gas cocurrently through the vessel before countercurrent depressurization of the vessel. In any event, the purge step serves to remove additional undesired component from the adsorbent by increasing the partial pressure of the desired component in the vessel, thereby causing replacement of undesired component from the adsorbent, and by flushing undesired component from the vessel.

When a PSA process is practiced to recover a strongly adsorbed component from a gas mixture and the gas mixture contains more than one component that is preferentially adsorbed by the adsorbent, it is difficult to recover the desired component in high purity and at high yield. Improvements which enhance the purity and yield of strongly adsorbed products produced in PSA processes are continually sought. The present invention provides such an improvement.

SUMMARY OF THE INVENTION

According to a broad embodiment, the invention comprises an improvement to a pressure swing adsorption process for producing second component-enriched gas from a gas mixture containing first and second components in at least one adsorption zone containing an adsorbent which selectively adsorbs the second component, comprising repeatedly performing in each adsorption zone the following sequence of steps:

(a) pressurizing the adsorption zone to a selected adsorption pressure;

(b) cocurrently introducing the gas mixture into the adsorption zone at the selected adsorption pressure while cocurrently removing first component-enriched gas therefrom;

(c) purging the adsorption zone by cocurrently introducing thereinto part of the second component-enriched gas produced in step (d), while cocurrently removing purge effluent therefrom; and (d) depressurizing the adsorption zone by countercurrently removing gas therefrom, thereby producing the second component-enriched gas;

the improvement comprising compressing the purge effluent and cocurrently introducing the compressed purge effluent into the adsorption zone as (i) part or all of step (a), (ii) a high pressure purge step between step (b) and step (c), or (iii) a combination of (i) and (ii).

In a preferred embodiment of the above broad embodiment, the improvement comprises cocurrently introducing the compressed purge effluent into the adsorption zone as a high pressure purge step between step (b) and step (c) and further comprises cocurrently withdrawing high pressure purge effluent from the adsorption zone. In another preferred embodiment, the process further comprises cocurrently introducing the high pressure purge effluent into the adsorption zone as (i) part or all of step (a), (ii) part of step (b) or (iii) part or all of step (a) and part of step (b).

In another preferred embodiment, the purge effluent is compressed to a pressure at least as high as the selected adsorption pressure prior to cocurrently introducing the compressed purge effluent into the adsorption zone.

In another preferred embodiment, the process further comprises, between steps (b) and (c) but after the high pressure purge step, when included in the process, a cocurrent partial depressurization step during which second component-depleted gas is cocurrently removed from the adsorption zone. In another preferred embodiment, the process further comprises cocurrently introducing the second component-depleted gas into the adsorption zone as (i) part or all of step (a), (ii) part of step (b) or (iii) part or all of step (a) and part of step (b).

In another preferred embodiment, the process further comprises compressing the second component-depleted gas to a pressure at least as high as the selected adsorption pressure and cocurrently introducing the compressed second component-depleted gas into the adsorption zone as: (i) part or all of step (a), (ii) part of step (b), (iii), the high pressure purge step, or (iv) a combination of two or all of (i), (ii) and (iii). In a more preferred embodiment, the compressed second component-depleted gas is cocurrently introduced into the adsorption zone as part or all of step (a) and the compressed purge effluent is cocurrently introduced into the adsorption zone as the high pressure purge step.

In another preferred embodiment, the process comprises compressing the second component-depleted gas and cocurrently purging the adsorption zone with the compressed second component-depleted gas between step (b) and the high pressure purge step, thereby producing a second component-depleted purge effluent. In a more preferred embodiment, the process further comprises cocurrently introducing the second component-depleted purge effluent into the adsorption zone as (i) part or all of step (a), (ii) part of step (b) or (iii) part or all of step (a) and part of step (b).

In another preferred embodiment, the process further comprises a high pressure purge step and a first additional step comprising removing a first equalization effluent stream from the adsorption zone between the high pressure purge step and step (c) or between steps (c) and (d) and a second additional step comprising introducing the first equalization effluent stream into the adsorption zone between step (d) of one cycle of the process and step (a) of the following cycle of the process. In a preferred aspect of this preferred embodiment, the first additional step comprises removing the first equalization effluent stream from the adsorption zone between steps (c) and (d). The process preferably additionally comprises, between the high pressure purge step and step (c), a partial depressurization step during which second component-depleted gas is cocurrently removed from the adsorption zone.

In another preferred embodiment, the process further comprises a third additional step comprising removing a second equalization effluent stream from the adsorption zone between the high pressure purge step and step (c), and a fourth additional step comprising introducing the second equalization effluent stream into the adsorption zone between the second additional step of one cycle of the process and step (a) of the following cycle of the process. In this preferred embodiment, the process preferably further comprises, between the high pressure purge step and step (c), a partial depressurization step during which second component-depleted gas is cocurrently removed from the adsorption zone. In a preferred aspect of this preferred embodiment, the partial depressurization step is between the third additional step and step (c).

In another preferred embodiment, the process further comprises a fifth additional step comprising removing a third equalization effluent stream from the adsorption zone between the high pressure purge step and the partial depressurization step, and a sixth additional step comprising introducing the third equalization effluent stream into the adsorption zone between the fourth additional step of one cycle of the process and step (a) of the following cycle of the process.

In another preferred embodiment, the first additional step comprises removing the first equalization effluent stream from the adsorption zone between the high pressure purge step and step (c). In this preferred embodiment, the process preferably further comprises, between the high pressure purge step and the first additional step, a cocurrent partial depressurization step during which second component-depleted gas is cocurrently removed from the adsorption zone. In a preferred aspect of this preferred embodiment, the process further comprises a third additional step comprising removing a second equalization effluent stream from the adsorption zone between the high pressure purge step and the cocurrent partial depressurization step, and introducing the second equalization effluent stream into the adsorption zone between the second additional step of one cycle of the process and step (a) of the following cycle of the process.

In any of the above preferred embodiments, the selected adsorption pressure is in the range of about 0.5 to about 50 bara. Preferably, the process further comprises, during step (d), reducing the pressure in the adsorption zone to about 0.1 to about 5 bara. In a more preferred embodiment, the selected adsorption pressure is about 1 to about 20 bara. In another more preferred embodiment, during step (d), the adsorption vessel is countercurrently evacuated to subatmospheric pressure.

In another preferred embodiment, the second component is carbon monoxide. In this preferred embodiment, the first component is preferably hydrogen, carbon dioxide, nitrogen or mixtures of these.

In another preferred embodiment, the process is carried out in a plurality of adsorption vessels arranged in parallel and operated out of phase. More preferably, the process is carried out in four adsorption vessels.

BRIEF DESCRIPTION OF THE DRAWINGS

The same reference characters are used to represent the same or similar steps in the various drawings.

DETAILED DESCRIPTION OF THE INVENTION

Figure 1:
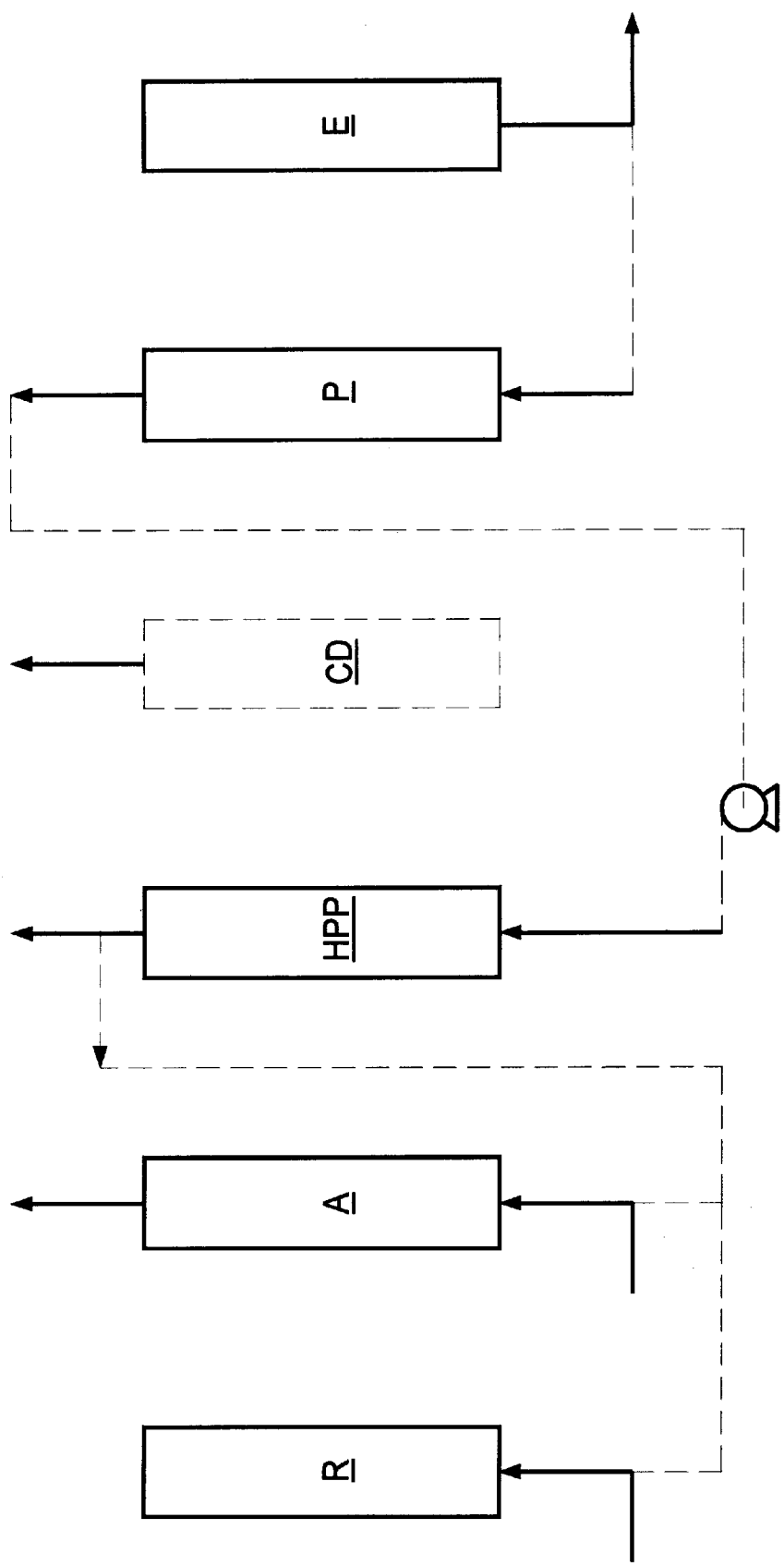
FIG. 1 illustrates a broad embodiment of the invention comprising a PSA cycle in which the effluent from the low pressure cocurrent purge step is compressed and used as a high pressure purge step after the adsorption step.

Conventional PSA processes designed primarily for the recovery of the strongly adsorbed component of a gas mixture generally comprise a pressurization step, an adsorption step, a cocurrent depressurization step, a low pressure product purge step and a countercurrent depressurization or production step. The process is generally carried out in one or more elongate adsorption vessels having a feed gas inlet at one end and a nonadsorbed gas outlet at the other end. The vessels are packed with adsorbent which adsorbs one component of the feed gas mixture more strongly than it adsorbs one or more components of the gas mixture.

During the pressurization step a vessel of the system is pressurized with the feed gas mixture or with nonadsorbed gas produced in previous cycles of the process, or with a combination of these gases. When the pressure in the vessel reaches the desired adsorption pressure the adsorption step is initiated. During the adsorption step, the feed gas mixture is passed cocurrently (in the direction from the feed inlet end toward the nonadsorbed gas outlet end) through the vessel, and as this step proceeds, strongly adsorbed component is preferentially adsorbed. The strongly adsorbed component forms a front which gradually moves cocurrently through the vessel. When the front reaches a predetermined point in the vessel, which is preferably prior to breakthrough of significant amounts of strongly adsorbed product through the nonadsorbed product gas outlet, the adsorption step is terminated and the cocurrent depressurization step begins. Cocurrent depressurization serves the purpose of removing most of the nonadsorbed gas component from the vessel. During this step, gas contained in the void spaces of the adsorbent is removed cocurrently from the adsorption vessel. When the vessel is depressurized to the desired extent, the cocurrent depressurization step is terminated and the cocurrent purge step is begun. The cocurrent purge step functions to scavenge additional nonadsorbed gas component from the adsorption vessel. During cocurrent purge, strongly adsorbed product gas produced in previous adsorption cycles is passed cocurrently through the adsorption vessel. The strongly adsorbed product gas displaces less strongly adsorbed component from the adsorbent and sweeps the displaced gas and residual void space gas out of the vessel. The final step of the basic process, countercurrent depressurization, is used to produce the strongly adsorbed gas product. During this step, strongly adsorbed gas product is removed from the adsorption vessel by countercurrently (the direction opposite the cocurrent direction) depressurizing the vessel. If depressurization is conducted to subatmospheric pressure, this step is usually carried out with the aid of a vacuum pump or other evacuating means.

In spite of the fact that the vessel is purged with strongly adsorbed product gas, residual nonadsorbed gas component still remains in the adsorbent and in the adsorption vessel itself. A principal objective of this invention is to modify the above conventional process in a manner which enhances the yield of strongly adsorbed product gas and reduces the concentration of nonadsorbed component remaining in the adsorption vessel at the outset of the cocurrent depressurization step, thereby reducing the concentration of nonadsorbed gas component in the adsorption vessel during each subsequent step of the process.

The process of the invention is generally carried out in an adsorption system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the desired gas component, while one or more other units are undergoing regeneration to desorb and collect the adsorbed gas component. Operation of the adsorption systems of the invention is cyclical. In preferred embodiments of the invention, adsorption cycles are repeatedly carried out in a manner such that feed and production of the desired product gas are substantially continuous.

The adsorbent used in the adsorption vessels will depend upon the particular gas to be separated from the gas mixture as the strongly adsorbed component. Typical adsorbents include silica gel, alumina, activated carbon, carbon molecular sieves, natural zeolites, such as mordenite, faujasite, clinoptilolite, chabazite, etc. and synthetic zeolites, such as types A, X and Y zeolites. When the strongly adsorbed gas being separated from the gas mixture is carbon monoxide, preferred adsorbents include copper$^+$-, silver$^+$-, and palladium$^{++}$-containing adsorbents of the above classes. Preferred carbon monoxide-selective adsorbents include copper ion and silver ion containing adsorbents, such as copper$^+$ salt- or silver$^+$ salt-containing alumina and copper$^+$- and silver$^+$-exchanged zeolites.

The pressure at which the adsorption step of the process is carried out is a matter of choice. Typically, the adsorption is carried out at a pressure above about 1 bar, absolute (bara). The upper pressure limit is determined by economics and limitations of the adsorption system and, in general, it is desirably about 70 bara, preferably about 20 bara and most preferably about 5 bara. The pressure at which adsorbent regeneration is carried out is likewise a matter of choice, and the minimum pressure depends upon whether or not vacuum equipment is used to withdraw adsorbed gas from the adsorption vessels. Typically, the lower pressure limit during adsorbent regeneration in vessel A can be as low as 50 mbara (millibar absolute), but is preferably not lower than about 150 mbara, and is most preferably not lower than about 200 mbara. Adsorbent regeneration may be carried out at pressures as high as 5 bara, but is preferably carried out at pressures not higher than about 2 bara, and most preferably at pressures not above about 1 bara.

Although the process may be used to separate the components of any gas mixture, it will be described in detail as it applies to the separation of carbon monoxide, as the sorbate, from a gas mixture comprised of hydrogen, carbon monoxide, carbon dioxide, methane and nitrogen. Also, the process will be described as taking place in a single vessel undergoing a series of steps, but, generally it is more convenient to practice the process in an adsorption system comprised of two or more vessels.

A clear understanding of the invention is provided by the following description taken together with the appended drawings. Turning now to the drawings, and particularly to FIG. 1, there is illustrated therein a series of steps comprising a broad embodiment of the invention. The steps of the conventional version of the process are those labeled R, A, CD, P and E. Step R is the pressurization step, when the cycle is the initial cycle of a run, or a repressurization step, for the second and subsequent cycles of the run. A stands for the adsorption step, CD represents the cocurrent depressurization step, P stands for the purge step and E stands for the countercurrent depressurization or evacuation step. In broader versions of the process, steps CD and P can be carried out in the countercurrent direction, although this is less preferred. Step CD is shown in dashed form to indicate that this step, although important in preferred embodiments of the invention, is optional in the embodiment illustrated in FIG. 1. As can be seen from FIG. 1, step E is used to produce the strongly adsorbed product and to provide the purge gas for purge step P. Lines joining the various steps of the process are shown in dashed form to indicate that in a single vessel system the various steps are not contemporaneous and that the gas leaving the adsorption vessel does not go directly back to the adsorption vessel. Gas storage means (not shown) are provided in one-vessel systems to hold the gas removed from the vessel pending its reintroduction into the vessel in subsequent steps of the process.

A key step of the process illustrated in FIG. 1 is step HPP, which stands for high pressure purge. This step is carried out by compressing the gas removed from the adsorption vessel during step P to the pressure at which it is desired to conduct the high pressure purge, which is preferably at or above the pressure maintained in the adsorption vessel during step A (the selected adsorption pressure), or at any pressure intermediate the selected adsorption pressure and the pressure in the vessel at the beginning of step P. The pressure in the adsorption vessel may be held constant during the high pressure purge step or it may be reduced over the course of this step. The benefit provided by conducting a high pressure purge prior to the cocurrent depressurization step, when this step is included in the cycle, or immediately prior to the purge step when the cycle does not include a cocurrent depressurization step, is realized because the high concentration of strongly adsorbed product gas in the gas released from the adsorption vessel during step P causes additional nonadsorbed (or weakly adsorbed) gas components (impurities) to be desorbed from the adsorbent during the high pressure purge step. Thus, at the conclusion of step HPP the concentration of impurities in the sorbed phase will be somewhat lower than if the cycle did not include a HPP step. Consequently, the concentration of impurities present in the adsorption vessel during each step following the high pressure purge step will be lower, and the strongly adsorbed product produced during step E will enhance recovery of the strongly adsorbed product.

When the cocurrent depressurization is eliminated from the above cycle, its function is performed by the high pressure purge step, or by purge step P, or by a combination of these purge steps, by reducing the pressure in the adsorption vessel during one or both of these steps.

As further illustrated in FIG. 1, the effluent issuing from the adsorption vessel during high pressure purge step HPP can be discharged from the system or recycled to the adsorption vessel during one or both of repressurization step R or adsorption step A. The advantage of recycling the gas to the adsorption vessel during step R or step A is that the recovery of strongly adsorbed component from the feed gas is enhanced. An additional advantage of the embodiment in which the HPP effluent is recycled to the adsorption vessel during step R is that pressure energy from step HPP is preserved, thus making the overall process more efficient.

Figure 2:
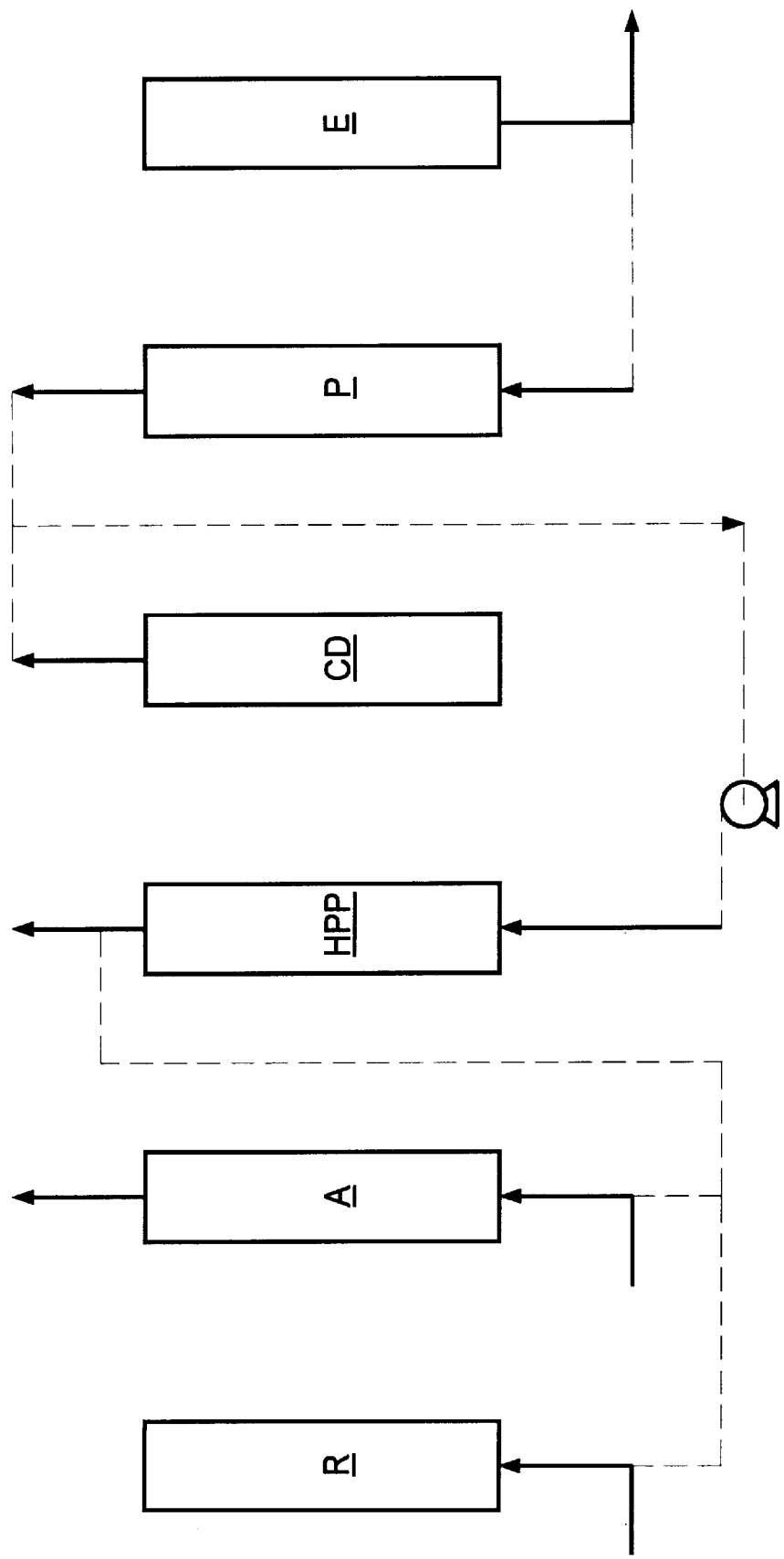
FIG. 2 illustrates a first variation of the embodiment illustrated in FIG. 1, wherein the effluent from the cocurrent depressurization step and the effluent from the low pressure cocurrent purge step are combined and used as feed for the high pressure purge step.

The process illustrated in FIG. 2 is a variation of the process illustrated in FIG. 1. In the FIG. 2 embodiment, effluent discharged from the adsorption vessel during cocurrent depressurization step CD is combined with the effluent produced during step P and the mixture is compressed and used as a purge stream in step HPP. The benefit obtained from practice of the process of FIG. 2 is that additional strongly adsorbed product gas that would otherwise be discharged from the system during cocurrent depressurization step CD is adsorbed during step HPP.

Figure 3:
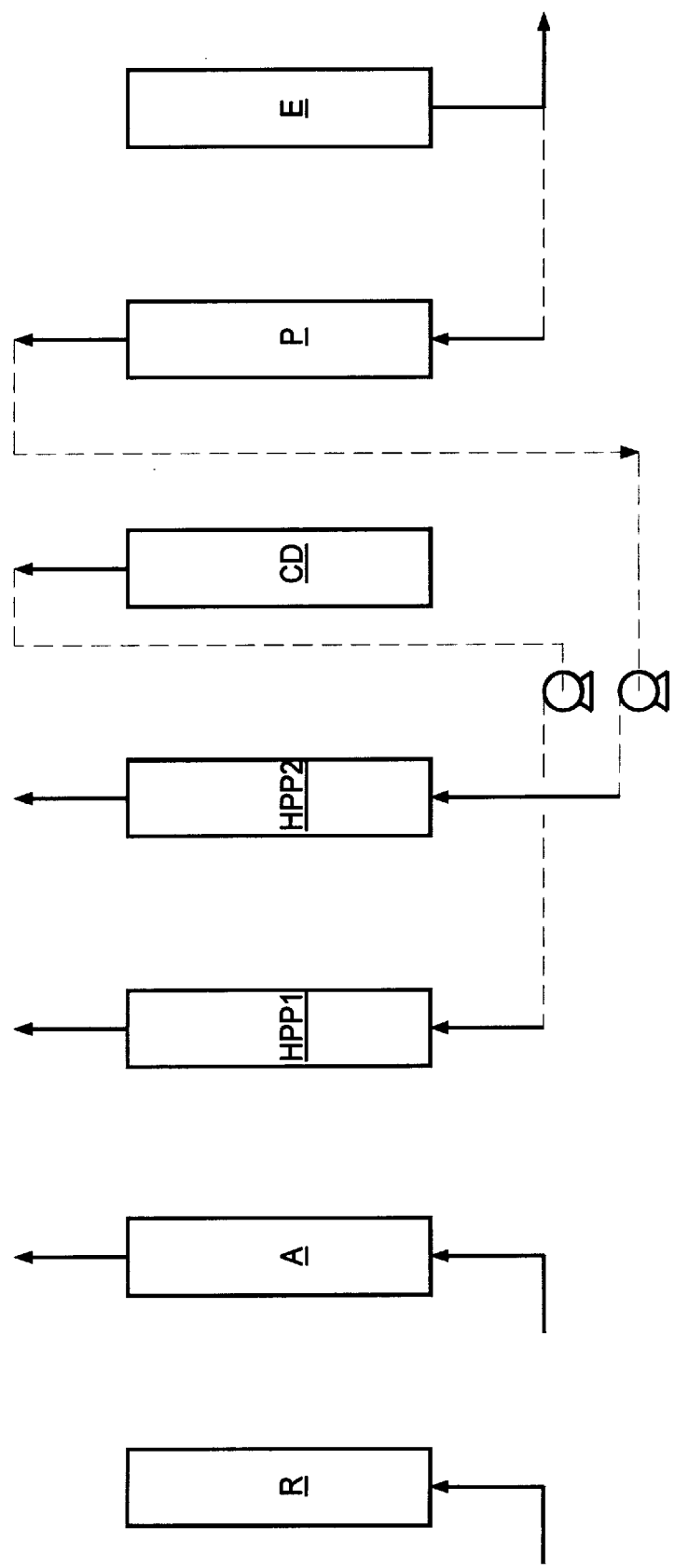
FIG. 3 illustrates a second variation of the embodiment illustrated in FIG. 1, wherein the effluent from the cocurrent depressurization step is compressed and used as a preliminary high pressure purge step prior to the high pressure purge step of FIG. 1.

The process illustrated in FIG. 3 is a variation of the process illustrated in FIG. 2. The cycle of FIG. 3 includes first high pressure purge step HPP1 and second high pressure purge step HPP2. The gas used as the purge stream in step HPP1 is the effluent from cocurrent depressurization step CD. This effluent is compressed independently of the compression of the effluent from purge step P and reintroduced into the adsorption vessel prior to step HPP2 (which is identical to step HPP of FIG. 1). The advantage that this embodiment has over the embodiment of FIG. 2 results from the fact that the effluent from step CD has a lower average concentration of strongly adsorbed component than the effluent from step P. This means that the concentration of strongly adsorbed gas component in the purge stream during step HPP2 is greater than the concentration of strongly adsorbed gas component in the purge stream during step HPP of the FIG. 2 embodiment; thus, more nonadsorbed or weakly adsorbed gas component will be displaced in the adsorbent in the FIG. 3 high pressure purge steps than in the FIG. 2 high pressure purge step. Although two gas compressors or blowers are illustrated in the FIG. 3 embodiment, a single gas compressor or blower can be used in single vessel systems, since steps CD and P are not contemporaneous.

Figure 4:
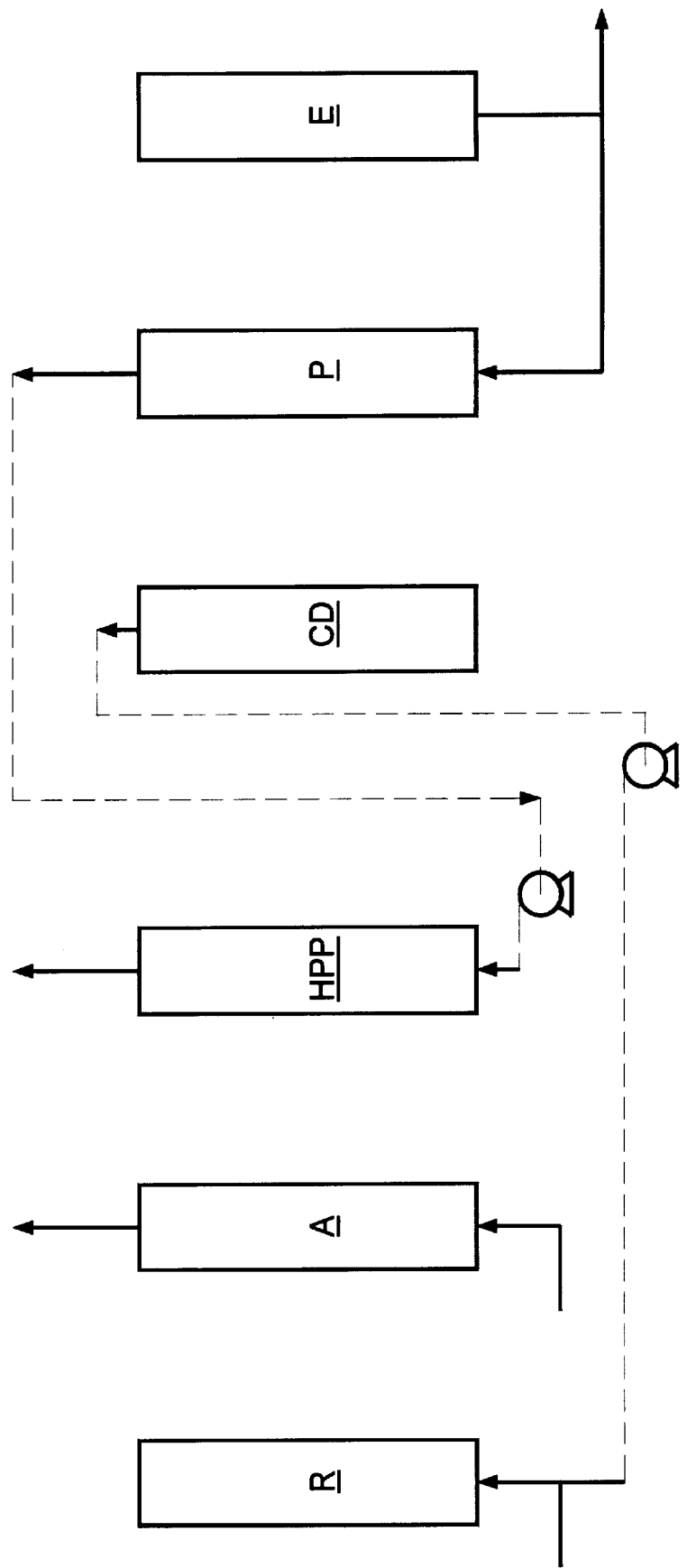
FIG. 4 illustrates a third variation of the embodiment illustrated in FIG. 1, wherein the effluent from the cocurrent depressurization step is used to partially pressurize the adsorption vessel prior to the adsorption step.

The embodiment illustrated in FIG. 4 is another variation of the embodiment illustrated in FIG. 2. The principal advantage of the FIG. 4 embodiment is that pressure energy is conserved since the pressurized effluent removed from this adsorption vessel during step CD is used to repressurize the adsorption vessel in preparation for the adsorption step. A second advantage of this embodiment is that additional strongly adsorbed gas component will be recovered from the feed gas since the average concentration of strongly adsorbed gas component in the step CD effluent is greater than the concentration of strongly adsorbed gas component in the feed gas. As was the case in the FIG. 3 embodiment, a single gas compressor or blower can be used in the FIG. 4 embodiment in single vessel systems, since steps CD and P are not contemporaneous.

Additional details of the equalization steps illustrated in FIGS. 5–9, and of other steps which are considered part of this invention are set forth in our copending U.S. patent application entitled "Multiple Equalization Pressure Swing Adsorption Process", Attorney Docket Number 98A441, filed of even date with this application, the specification and claims of which are incorporated herein by reference.

The processes shown in FIGS. 5–9 are modifications of the broad embodiments of this invention. The FIGS. 5–9 embodiments include one or more low pressure equalization steps, which provide additional enhancement of the purity of the strongly adsorbed product produced by the processes of this invention.

Figure 5:
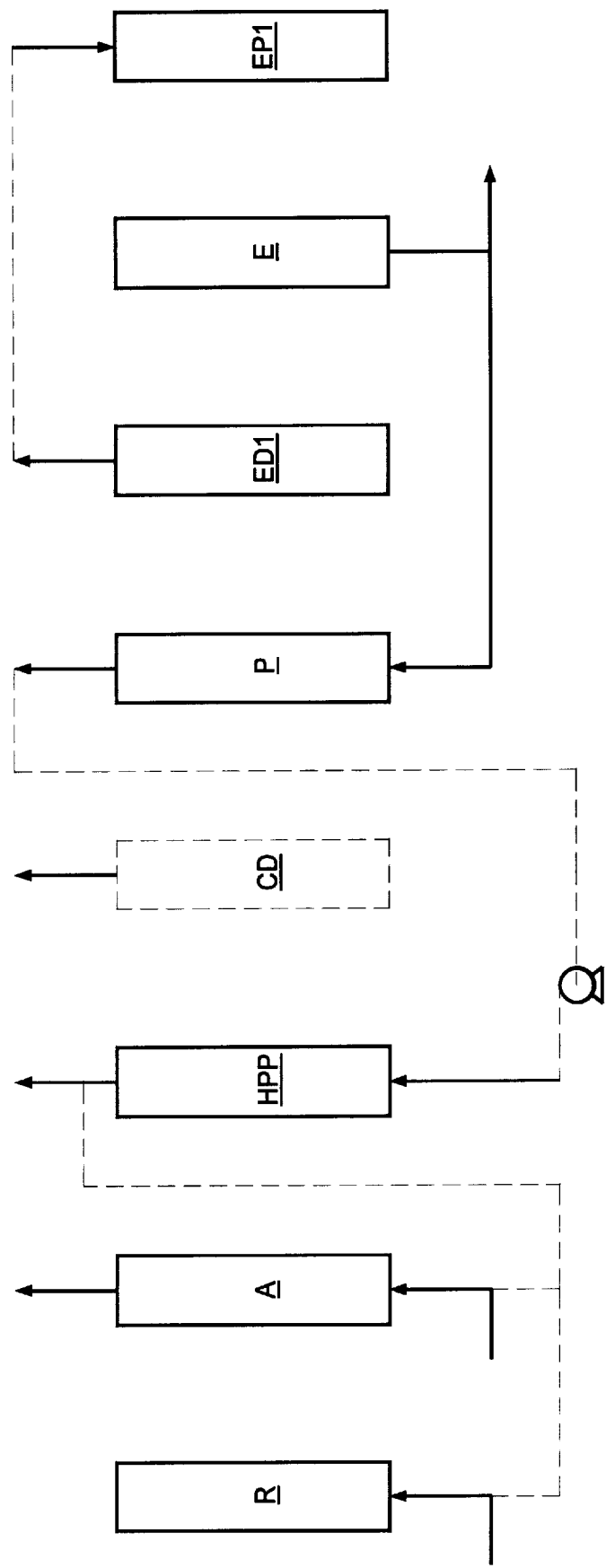
FIG. 5 illustrates a fourth variation of the invention illustrated in the embodiment of FIG. 1, further comprising a low pressure equalization step after the low pressure cocurrent purge step.

The FIG. 5 process, which is a modification of the FIG. 1 process, includes all of the steps of the FIG. 1 process and a low pressure equalization procedure. The first part of the equalization procedure, depressurization step ED1, occurs between cocurrent purge step P and countercurrent depressurization step E, and the second part of the equalization procedure, pressurization step EP1, occurs between countercurrent depressurization step E of one cycle of the process and repressurization step R of the next cycle of the process. The equalization step is represented in FIG. 5 as taking place between the nonadsorbed outlet ends of the vessel (outlet-to-outlet equalization). Although this is the preferred method of equalization, other equalization techniques, such as inlet-to-inlet, outlet to inlet or inlet-to-inlet/outlet-to-outlet equalization methods can be employed.

The advantage provided by conducting an equalization step after the purge step results because of the high concentration of strongly adsorbed product gas in the purge stream causes additional nonadsorbed (or weakly adsorbed) gas components (impurities) to be desorbed from the adsorbent during the purge step. Conducting the equalization step after the purge step results in the removal of additional gas impurities from the vessel prior to the countercurrent depressurization step, thus enhancing the purity of the strongly adsorbed product gas, and also results in the transfer of strongly adsorbed gas-rich gas removed from the adsorption vessel during step ED1 back into the adsorption vessel during step EP1, thus avoiding loss of strongly adsorbed product gas during the equalization step.

Figure 6:
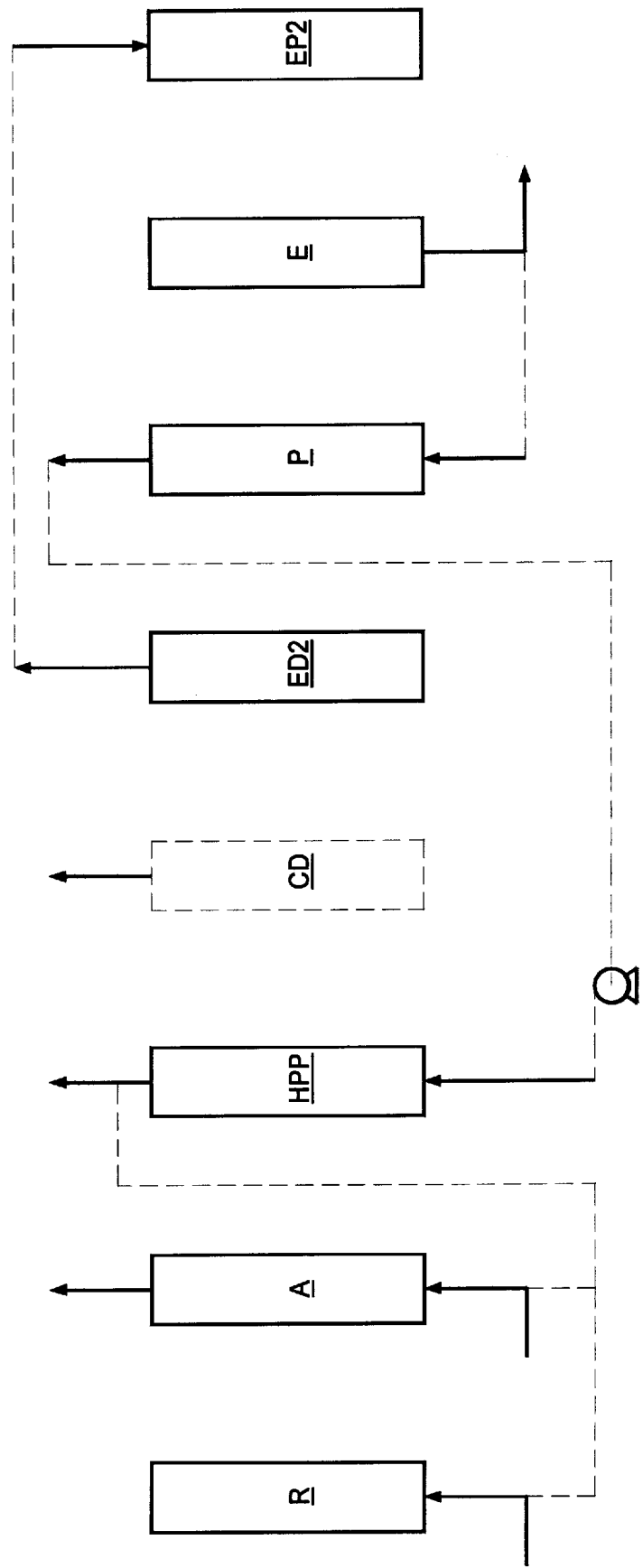
FIG. 6 illustrates a variation of the process illustrated in FIG. 5, wherein the first part of the low pressure equalization step occurs prior to the low pressure cocurrent purge step.

The process illustrated in FIG. 6 is similar to that of FIG. 5, except that in the FIG. 6 process, the equalization-depressurization step, step ED2, is carried out before the purge step. The second part of the equalization step, step EP2, is substantially identical to step EP1 of the FIG. 5 process. Step CD in the FIG. 6 process serves to remove gas mixture that is relatively depleted in strongly adsorbed component. Step ED2 of the FIG. 6 embodiment serves to recover strongly adsorbed component remaining in the adsorption vessel after step HPP (when step CD is not included in the process) and it serves to recover strongly adsorbed component remaining in the adsorption vessel after step CD (when step CD is included in the process).

Figure 7:
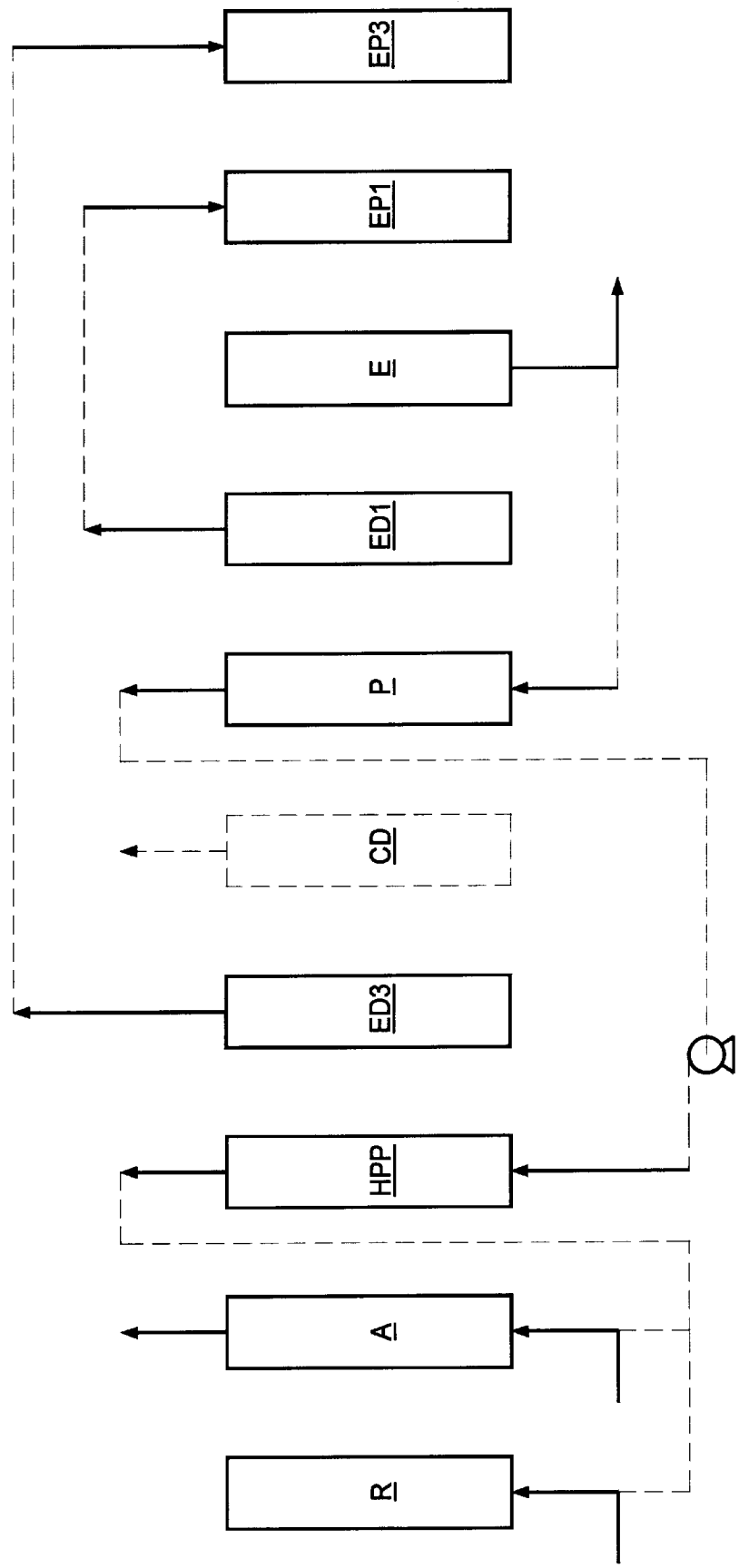
FIG. 7 illustrates a modification of the embodiment illustrated in FIG. 5, having a high pressure equalization step the first part of which occurs prior to the cocurrent depressurization step.

The process illustrated in FIG. 7 is a modification of the FIG. 5 process wherein the cycle includes an additional equalization procedure, comprising steps ED3 and EP3. The principal purpose of the additional equalization procedure is to preserve energy pressure, particularly energy pressure that is lost during step CD of the FIG. 5 process, when step CD is included in the process. Step EP3 follows step EP1 in the cycle, since the gas introduced into the adsorption vessel during step EP3 is greater than the pressure in the vessel at the end of step EP1. Although step CD is illustrated in FIG. 7 as following step ED3, step CD can precede step ED3. In the latter case, steps ED3 and EP3 become steps ED2 and EP2, respectfully, of the FIG. 6 process, and the FIG. 7 process then includes both the equalization step of FIG. 5, comprising steps ED1 and EP1, and the equalization step of FIG. 6, comprising steps ED2 and EP2. In any event, Step CD is optional in the process illustrated in the FIG. 7 process.

Figure 8:
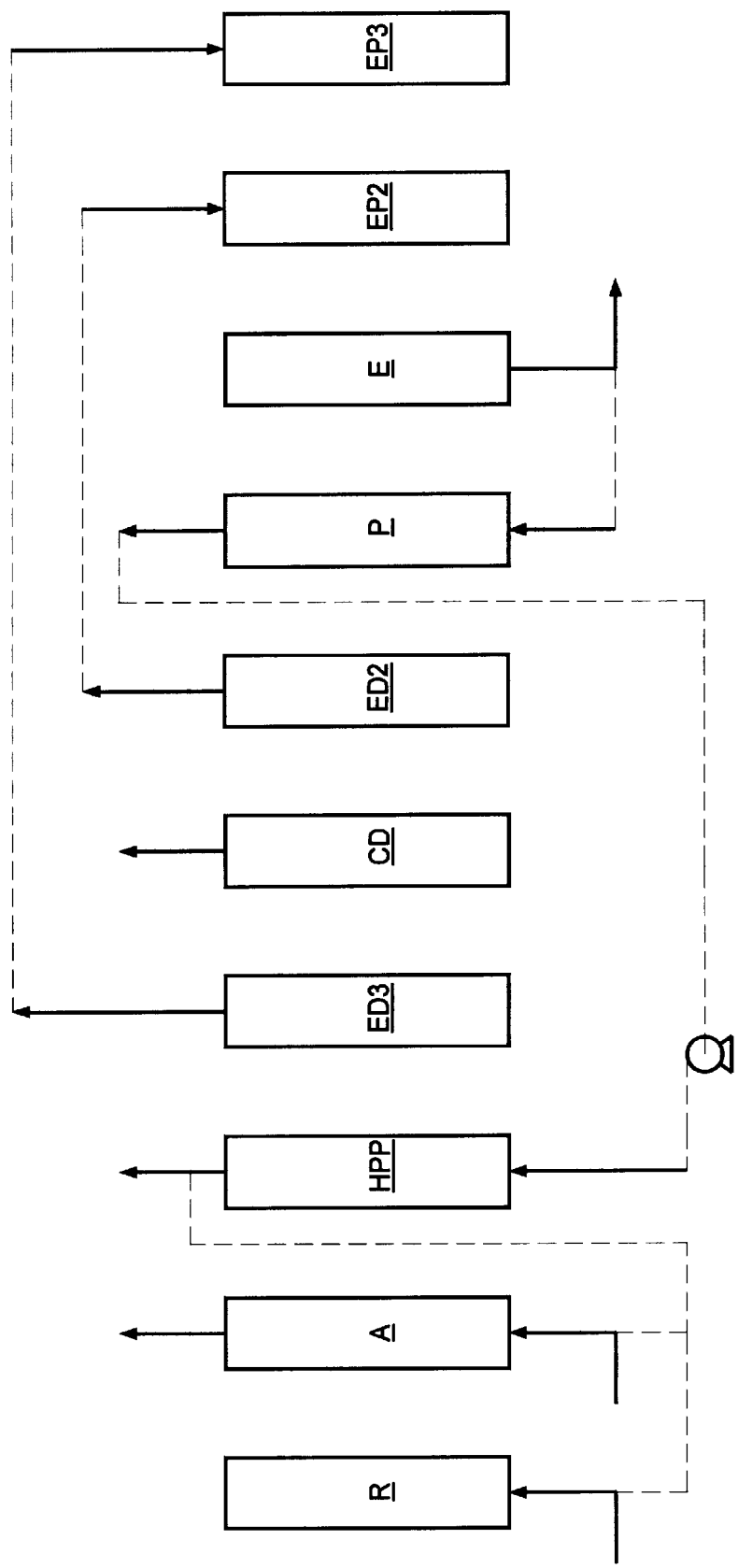
FIG. 8 illustrates a modification of the embodiment illustrated in FIG. 6, having a high pressure equalization step the first part of which occurs prior to the cocurrent depressurization step.

The FIG. 8 process is a modification of the FIG. 6 process. As was the case in the FIG. 7 process, the extra equalization step of the FIG. 8 process serves primarily to preserve some of the energy pressure that would be lost in step CD if steps ED3/EP3 were not included in the cycle. Step EP3 follows step EP2 in the cycle since the pressure in the adsorption vessel at the beginning of step EP3 is greater than the pressure in the vessel at the end of step EP2. Step CD is required in the FIG. 8 process.

Figure 9:
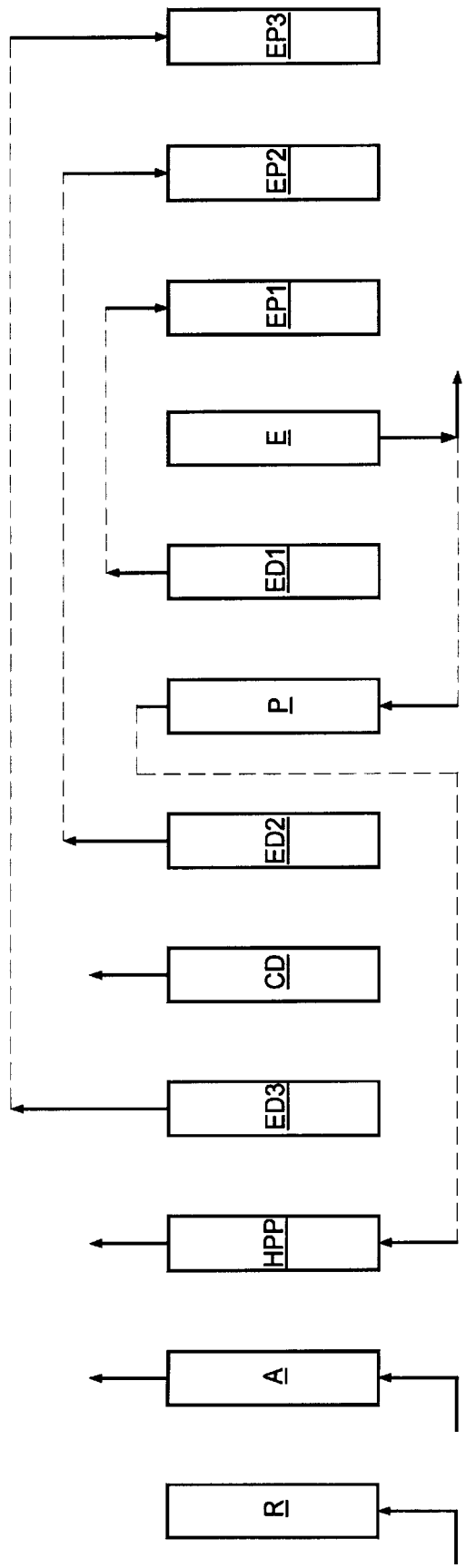
FIG. 9 illustrates a modification of the embodiment illustrated in FIG. 7, having a high pressure equalization step and two low pressure equalization steps.

The process of FIG. 9 is more preferred than the processes illustrated in FIGS. 5–8, since it incorporates all of the advantages of the FIGS. 5–8 processes into a single process. Thus, the FIG. 9 process includes the strongly adsorbed product purification benefit of the FIGS. 5 and 6 processes and the pressure energy saving benefit of the process of FIGS. 7 and 8. Steps EP1, EP2 and EP3 occur in the order shown in FIG. 9, since the pressure on the adsorption vessel at the beginning of step EP2 is greater than the pressure in the vessel at the end of step EP1, and the pressure in the adsorption vessel at the beginning of step EP3 is greater than the pressure in the vessel at the end of step EP2. Step CD is required in the FIG. 9 process.

The equalization procedures illustrated in FIGS. 5–9 can be employed in the processes illustrated in FIGS. 2–4, if desired. Furthermore, other embodiments disclosed in our above-referenced copending application can be incorporated in the processes illustrated and described herein.

The Table illustrates a preferred embodiment of the invention in which four adsorption vessels, vessels B1 to B4, are operated in parallel and 90° out of phase, and a single vacuum pump is used for all evacuation steps of the process. The adsorption cycle includes the eight steps of the preferred cycle described above and illustrated in FIG. 5.

Referring to the Table and to FIG. 5, the steps of the cycle are: repressurization (RP), step 1; adsorption (A), step 2; high pressure purge (HPP), step 3; cocurrent depressurization (CD), step 4; purge (P), step 5; equalization depressurization (ED1), step 6; evacuation (E), step 7 and equalization repressurization (EP1), step 8.

TABLE

| B1 | A   | HPP | CD P | ED1 | E    | EP1 | R   | A   |
| B2 | R   | A   |      | HPP | CD P | ED1 | E   | EP1 |
| B3 | E   | EP1 | R    | A   |      | HPP | CD P | ED1 |
| B4 | CD P | ED1 | E    | EP1 | R    | A   |     | HPP |

It will be appreciated that it is within the scope of the present invention to utilize conventional equipment to monitor and automatically regulate the flow of gases within the system so that it can be fully automated to run continuously in an efficient manner.

Although the invention has been described with particular reference to specific equipment arrangements, these features are merely exemplary of the invention and variations are contemplated. The scope of the invention is limited only by the breadth of the appended claims.

What is claimed is:

1. In a pressure swing adsorption process for producing second component-enriched gas from a gas mixture containing first and second components in at least one adsorption zone containing an adsorbent which selectively adsorbs said second component, comprising repeatedly performing in each adsorption zone the following sequence of steps:

(a) pressurizing said adsorption zone to a selected adsorption pressure;

(b) cocurrently introducing said gas mixture into said adsorption zone at said selected adsorption pressure while cocurrently removing first component-enriched gas therefrom;

(c) purging said adsorption zone by cocurrently introducing thereinto part of the second component-enriched gas produced in step (d), while cocurrently removing purge effluent therefrom; and (d) depressurizing said adsorption zone by countercurrently removing gas therefrom, thereby producing second component-enriched gas;

the improvement comprising compressing said purge effluent and cocurrently introducing the compressed purge effluent into said adsorption zone as (i) part or all of step (a), (ii) a high pressure purge step between step (b) and step (c), or (iii) a combination of (i) and (ii).

2. The improved process of claim 1, wherein said compressed purge effluent is cocurrently introduced into said adsorption zone as said high pressure purge step, and said high pressure purge step further comprises cocurrently withdrawing high pressure purge effluent from said adsorption zone.

3. The improved process of claim 2, further comprising cocurrently introducing said high pressure purge effluent into said adsorption zone as (i) part or all of step (a), (ii) part of step (b) or (iii) part or all of step (a) and part of step (b).

4. The improved process of claim 1, wherein said purge effluent is compressed to a pressure at least as high as said selected adsorption pressure prior to cocurrently introducing the compressed purge effluent into said adsorption zone.

5. The improved process of any one of claims 1 to 4, further comprising, between steps (b) and (c) but after said high pressure purge step, when included in the process, a cocurrent partial depressurization step during which second component-depleted gas is cocurrently removed from said adsorption zone.

6. The improved process of claim 5, further comprising cocurrently introducing said second component-depleted gas into said adsorption zone as (i) part or all of step (a), (ii) part of step (b) or (iii) part or all of step (a) and part of step (b).

7. The improved process of claim 5, further comprising compressing said second component-depleted gas to a pressure at least as high as said selected adsorption pressure and cocurrently introducing the compressed second component-depleted gas into said adsorption zone as: (i) part or all of step (a), (ii) part of step (b), (iii), said high pressure purge step, or (iv) a combination of two or all of (i), (ii) and (iii).

8. The improved process of claim 7, wherein said compressed second component-depleted gas is cocurrently introduced into said adsorption zone as part or all of step (a) and said compressed purge effluent is cocurrently introduced into said adsorption zone as said high pressure purge step.

9. The improved process of claim 5, further comprising compressing said second component-depleted gas and cocurrently purging said adsorption zone with the compressed second component-depleted gas between step (b) and said high pressure purge step, thereby producing a second component-depleted purge effluent.

10. The improved process of claim 9, further comprising cocurrently introducing said second component-depleted purge effluent into said adsorption zone as (i) part or all of step (a), (ii) part of step (b) or (iii) part or all of step (a) and part of step (b).

11. The process of claim 2, further comprising a first additional step comprising removing a first equalization effluent stream from said adsorption zone between said high pressure purge step and step (c) or between steps (c) and (d) and a second additional step comprising introducing said first equalization effluent stream into said adsorption zone between step (d) of one cycle of said process and step (a) of the following cycle of the process.

12. The improved process of claim 11, wherein said first additional step comprises removing said first equalization effluent stream from said adsorption zone between steps (c) and (d).

13. The improved process of claim 12, further comprising, between said high pressure purge step and step (c), a partial depressurization step during which second component-depleted gas is cocurrently removed from said adsorption zone.

14. The improved process of claim 12, further comprising a third additional step comprising removing a second equalization effluent stream from said adsorption zone between said high pressure purge step and step (c), and a fourth additional step comprising introducing said second equalization effluent stream into said adsorption zone between the second additional step of one cycle of said process and step (a) of the following cycle of the process.

15. The improved process of claim 14, further comprising, between said high pressure purge step and step (c), a partial depressurization step during which second component-depleted gas is cocurrently removed from said adsorption zone.

16. The improved process of claim 15, wherein said partial depressurization step is between said third additional step and step (c).

17. The improved process of claim 16, further comprising a fifth additional step comprising removing a third equalization effluent stream from said adsorption zone between said high pressure purge step and said partial depressurization step, and a sixth additional step comprising introducing said third equalization effluent stream into said adsorption zone between the fourth additional step of one cycle of said process and step (a) of the following cycle of the process.

18. The improved process of claim 11, wherein said first additional step comprises removing said first equalization effluent stream from said adsorption zone between said high pressure purge step and step (c).

19. The improved process of claim 18, further comprising, between said high pressure purge step and said first additional step, a cocurrent partial depressurization step during which second component-depleted gas is cocurrently removed from said adsorption zone.

20. The improved process of claim 19, further comprising a third additional step comprising removing a second equalization effluent stream from said adsorption zone between said high pressure purge step and said cocurrent partial depressurization step, and a fourth additional step comprising introducing said second equalization effluent stream into said adsorption zone between the second additional step of one cycle of said process and step (a) of the following cycle of the process.

21. The improved process of any one of claims 1 to 4 wherein said selected adsorption pressure is in the range of about 0.5 to about 50 bara.

22. The improved process of claim 21, wherein during step (d) the pressure in said adsorption zone is reduced to about 0.1 to about 5 bara.

23. The improved process of claim 22, wherein said selected adsorption pressure is about 1 to about 20 bara.

24. The improved process of claim 23, wherein during step (d) said adsorption vessel is countercurrently evacuated to subatmospheric pressure.

25. The improved process of claim 22, wherein said second component is carbon monoxide.

26. The improved process of claim 25, wherein said first component is hydrogen, carbon dioxide, nitrogen or mixtures of these.

27. The improved process of any one of claims 1 to 4 wherein said at least one adsorption zone comprises a plurality of adsorption vessels arranged in parallel and operated out of phase.

28. The improved process of claim 27 wherein said plurality of adsorption vessels comprise four adsorption vessels.

* * * * *